Figure 1:
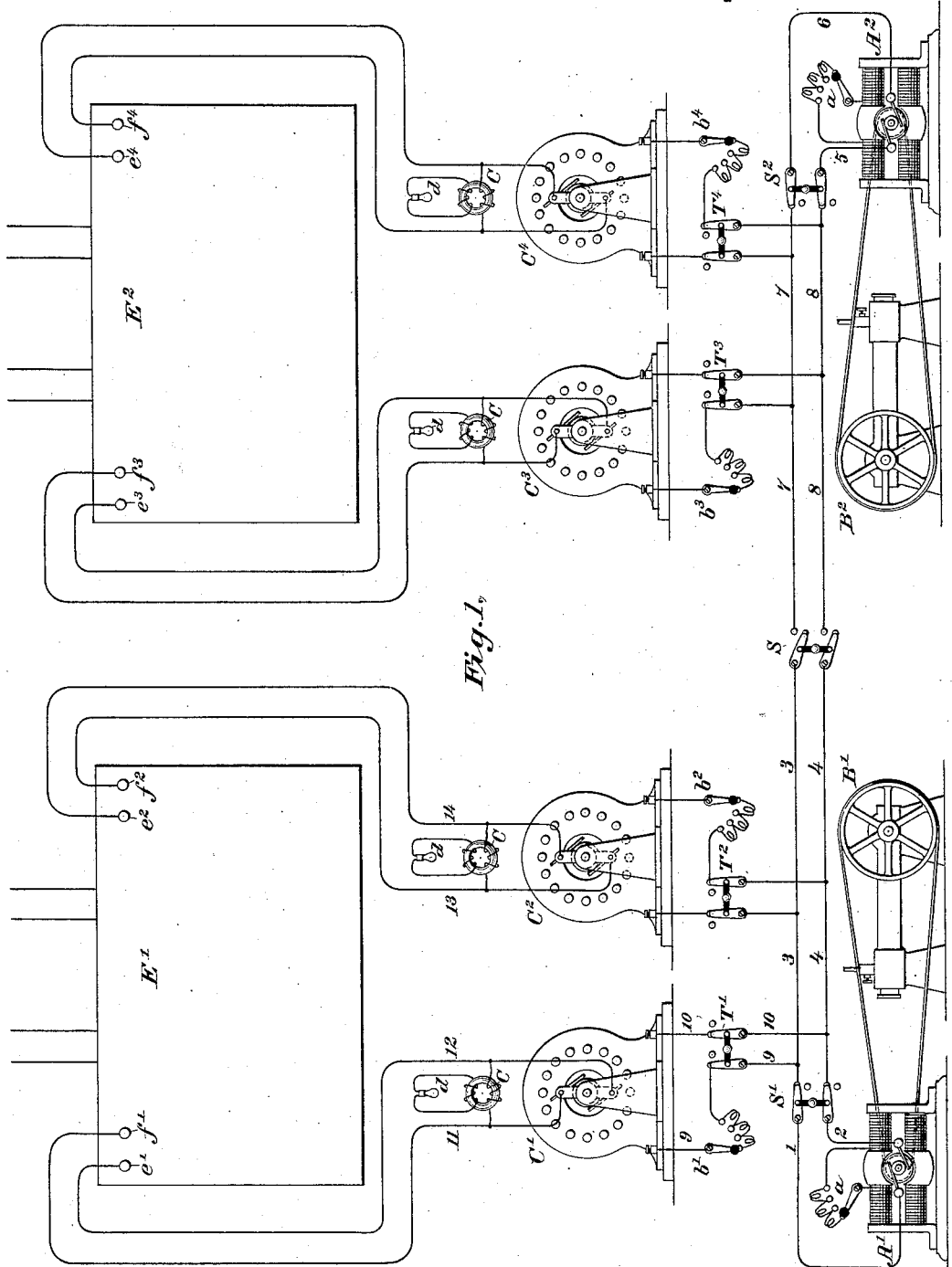

(No Model.) 2 Sheets—Sheet 1.

H. M. BYLLESBY & O. B. SHALLENBERGER.
ALTERNATE CURRENT SYSTEM OF ELECTRICAL DISTRIBUTION.

No. 381,054. Patented Apr. 10, 1888.

Witnesses
Geo. W. Breck.
Carrie E. Ashley

Inventors
H. M. Byllesby
O. B. Shallenberger
By their Attorneys
Pope, Edgecomb & Ferry (No Model.) 2 Sheets—Sheet 2.
H. M. BYLLESBY & O. B. SHALLENBERGER.
ALTERNATE CURRENT SYSTEM OF ELECTRICAL DISTRIBUTION.
No. 381,054. Patented Apr. 10, 1888.
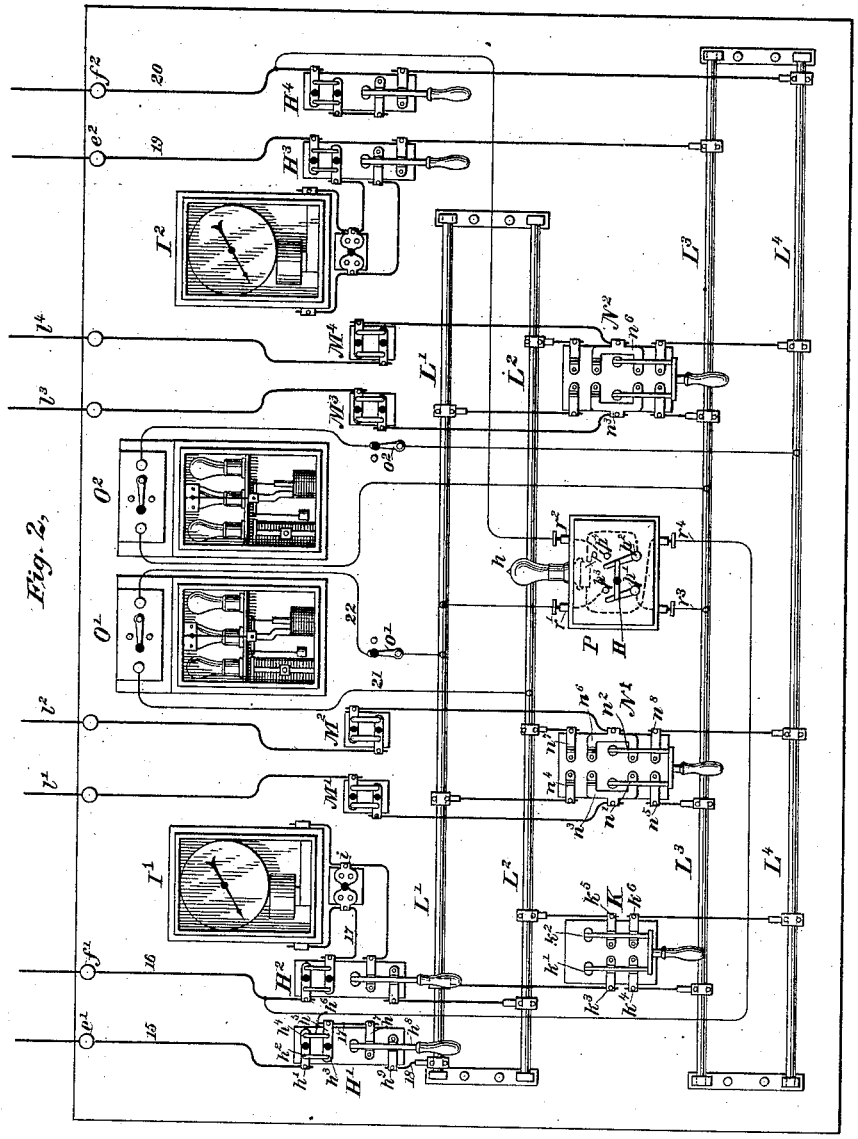
Witnesses
Geo. W. Breck
Carrie E. Ashley
Inventors
H. M. Byllesby
O. B. Shallenberger
By their Attorneys
Pope Edgecomb & Terry

UNITED STATES PATENT OFFICE.

HENRY M. BYLLESBY, OF PITTSBURG, AND OLIVER B. SHALLENBERGER, OF ROCHESTER, ASSIGNORS TO THE WESTINGHOUSE ELECTRIC COMPANY, OF PITTSBURG, PENNSYLVANIA.

ALTERNATE-CURRENT SYSTEM OF ELECTRICAL DISTRIBUTION.

SPECIFICATION forming part of Letters Patent No. 381,054, dated April 10, 1888.

Application filed October 29, 1887. Serial No. 253,710. (No model.)

*To all whom it may concern:*

Be it known that we, HENRY M. BYLLESBY and OLIVER B. SHALLENBERGER, citizens of the United States, residing, respectively, in Pittsburg, Allegheny county, and Rochester, Beaver county, both in the State of Pennsylvania, have invented certain new and useful Improvements in Alternate-Current Systems of Electrical Distribution, of which the following is a specification.

The invention relates to an organization of circuits and apparatus at the central station of a system of distribution employing alternating, intermittent, or pulsatory electric currents.

The invention consists, generally, in organizing the parts in substantially the following manner: A number of dynamo-electric generators are employed—say four in number. These have their field-magnets supplied by currents from two separate exciters, each provided with its own driving-engine. The field-magnets are connected in multiple arc with their respective exciters and the generators are independently regulated. The exciters may be of such capacity that either one may serve to supply the currents necessary for the entire system of alternate-current generators. Suitable switch and circuit-controlling devices are employed for connecting the exciting-generators in multiple arc with each other for the purpose of supplanting either one by the other. The several alternate-current generators are connected with their work-circuits in multiple arc or parallel circuit, and each has its own ammeter and voltmeter for determining the current. Each alternate-current generator is provided with a switch, whereby it may be thrown into and out of circuit, and each has a double-pole or two-way switch for connecting with either of two sets of feeders or main lines. Preferably, also, each generator is provided with a signal-light connected in the secondary circuit of a converter, the primary of which is connected across the poles of the generator, and this light is used as an indicator or pilot light. The distributing-wires leading to the work-circuits are connected with the trunk-wires through suitable double-pole switches.

In the accompanying drawings there is shown in diagram in Figure 1 an organization of circuits adapted to carry out the invention, and in Fig. 2 a detail of the switch-board.

Referring to the figures, A' and $A^2$ represent two continuous-current generators or exciters, driven, respectively, by engines B' and $B^2$, of any suitable character, and the field of each generator is provided with an adjustable resistance, $a$, by means of which its current may be regulated. The respective poles of the generator A' are connected by conductors 1 and 2 through a switch, S', with conductors 3 and 4, respectively. The poles of the generator $A^2$ are connected by conductors 5 and 6 through a switch, $S^2$, with the conductors 7 and 8, respectively. The conductors 3 and 7 and 4 and 8 may be connected with each other by means of a switch, S, thus placing the two generators in circuit with each other when it is so desired.

It will be understood that the poles of the generators are such that like currents will combine to flow in the same direction in the conductors.

Four alternate-current electric generators, C' $C^2$ $C^3$ $C^4$, are shown as applied to this system. The alternate-current generator C' has its field-magnet coils connected through a switch, T', and adjustable resistance or regulator $b'$ by conductors 9 and 10 with the conductors 3 and 4, respectively. These connections may be interrupted by moving the switch T'. In like manner the field-magnet coils of the alternate-current electric generator $C^2$ are connected with the conductors 3 and 4 through a switch, $T^2$, and regulator $b^2$. The generators $C^3$ and $C^4$ have their field-magnet coils connected with the conductors 7 and 8 through switches $T^3$ and $T^4$ and regulators $b^3$ and $b^4$, respectively.

It will be seen that if the switch S be open and the switch S' closed, as also the switches T' and $T^2$, the field-magnet coils of the generators C' and $C^2$ will be connected in multiple arc with the exciter A'. By opening the switch T' or $T^2$ the field of the corresponding generator will be cut out of circuit, and by opening the switch S' the fields of both generators will be disconnected. In like manner the connection between the exciter $A^2$ and generators $C^3$ and $C^4$ may be controlled, and in each instance the strength of current from the exciter may be regulated by the resistances $a$, while the electro-motive force of each generator may be separately controlled by the regulators $b'$ $b^2$, &c. In case it is desired, either exciter may be employed for supplying the field-magnet coils of all the generators $C'$ $C^2$ $C^3$ $C^4$. This is accomplished by closing the switch S and then opening the switch S' or $S^2$. In this manner either exciter which is at any time in operation will be first connected in multiple arc with the other by means of the switch S, and then the original exciter dropped out of circuit by opening the corresponding switch S' and $S^2$ without interrupting the operation of the system.

The generator C' has its respective poles connected by conductors 11 and 12 with binding-posts $e'$ and $f'$ upon a switch-board, E'. The generator $C^2$ has its respective poles connected by conductors 13 and 14 with binding-posts $e^2$ and $f^2$ upon the switch-board, and in like manner the two generators $C^3$ and $C^4$ have their poles connected with binding-posts $e^3$ $f^3$ and $e^4$ $f^4$ upon a switch-board, $E^2$. The connections from these several binding-posts are controlled by means of the apparatus upon the respective switch-boards, presently to be described.

For the purpose of determining the electro-motive force of the several generators each is supplied with a converter leading from its respective poles, as shown, and the secondary coil includes in its circuit an indicating device, such as a single incandescent electric lamp, $d$. This serves as a pilot-light for indicating the operation of the corresponding machine.

Referring, now, particularly to Fig. 2, each switch-board E' and $E^2$ is constructed in the following manner: The posts $e'$ and $f'$ are connected by conductors 15 and 16 with dynamo-switches H' and $H^2$, respectively. These are alike and but one need be described in detail. The conductor 15 leads to an insulating coupling-post, $h'$. This is connected by a fusible strip, $h^2$, with a second coupling-plate, $h^3$. The plates $h'$ and $h^3$ are respectively provided with coupling-plates $h^4$ and $h^5$, in connection with which they may be placed by suitable switch-plugs. The plates $h^4$ and $h^5$ are connected through a fusible strip, $h^6$. If, therefore, the circuit is closed through the strip $h^2$ and plates $h^3$ and $h^5$ and this strip be burned out, then the plates $h'$ and $h^4$ may be connected and the circuit thus completed through the strip $h^6$. The plate $h^5$ is connected by the conductor 17 with a switch-plate, $h^7$, applied to a lever, $h^8$, which is adapted to be placed in connection with the plate $h^7$ and at the same time with a second switch-plate, $h^9$. This latter is connected by conductor 18 with a trunk-line, L'. By opening the switch-lever $h^8$ these connections are interrupted. The connections are made in like manner from the conductor 16 through the dynamo-switch $H^2$ to the trunk-line $L^2$. In this switch the conductor 17, however, includes in its circuit an ammeter, I', of convenient construction. This may be cut out of circuit when desired by a short-circuiting switch, $i$. The binding-posts $e^2$ and $f^2$ are in like manner connected by conductors 19 and 20 through dynamo-switches $H^3$ and $H^4$ to the trunk-lines $L^3$ and $L^4$. An ammeter, $I^2$, is applied to the switch $H^3$.

For the purpose of connecting the lines L' and $L^2$ with the lines $L^3$ and $L^4$ when it is desired a switch, K, is employed. This consists of two levers, $k'$ and $k^2$, insulated from each other and provided with two contact-plates, $k^3$ $k^4$ and $k^5$ $k^6$. The plate $k^3$ is connected with the line L' and the plate $k^4$ with the line $L^3$. The plates $k^5$ and $k^6$ are respectively connected with the lines $L^2$ and $L^4$. By closing the switch-levers, therefore, the line L' will be connected with the line $L^3$ and the line $L^2$ with the line $L^4$.

The connections are made from the lines L' $L^2$ $L^3$ $L^4$ with the outgoing conductors $l'$, $l^2$, $l^3$, and $l^4$ by means of double-pole switches N' and $N^2$. These switches are alike and each has two insulated levers, $n'$ and $n^2$, each provided with three contact-plates, $n^3$ $n^4$ $n^5$ and $n^6$ $n^7$ $n^8$, respectively. When the levers are in one position, the plate $n^3$ is connected with the plate $n^5$ and the plate $n^6$ with the plate $n^8$. When the lever is thrown over, the connections are made from the plates $n^3$ and $n^6$ with the plates $n^4$ and $n^7$, respectively. The plates $n^3$ and $n^6$ of the switch N' are respectively connected through fusible cut-outs M' $M^2$ with the lines $l'$ and $l^2$, and the plates $n^3$ and $n^6$ of the switch $N^2$ are connected through fusible cut-outs $M^3$ and $M^4$ with the lines $l^3$ and $l^4$. The plates $n^4$ and $n^7$ of each switch N' and $N^2$ are respectively connected with the conductors L' and $L^2$, and the plates $n^5$ and $n^8$ of these switches are respectively connected with the lines $L^3$ and $L^4$. When, therefore, the switches are in the position shown, the conductors 15 and 16 are connected with the trunk lines or conductors L' and $L^2$, and these trunk lines or conductors are further connected with the lines $L^3$ and $L^4$, respectively. The conductors 19 and 20 are also connected with the lines $L^3$ and $L^4$. The lines $l'$ $l^2$ and $l^3$ $l^4$ are thus fed by the currents from both trunk-lines. By opening the switch N' the lines $l'$ $l^2$ will be disconnected. By opening the switch K the trunk-lines L' $L^2$ will be disconnected from the lines $L^3$ and $L^4$. If, then, the switch N' be closed upon the upper contacts, the lines $l'$ $l^2$ will be fed from the lines L' and $L^2$, and likewise the lines $l^3$ and $l^4$ will be supplied from the lines $L^3$ $L^4$ alone. By opening the switch $N^2$ the lines $l^3$ and $l^4$ will be disconnected. By closing it upon the upper contacts these latter will be fed from the trunk-lines L' and $L^2$. In this manner the supply-conductors $l'$ $l^2$ and $l^3$ $l^4$ may be connected with either dynamo C' $C^2$ alone or all fed jointly from the two.

Each pair of main trunk-lines is provided with a voltmeter, as shown at O' and O². These may be of any convenient construction. The voltmeter O' may be connected in circuit at will across the conductors L' and L² by means of conductors 21 and 22, including a switch, o', and the voltmeter O² may be connected between the conductors L³ and L⁴ through a switch, o².

For the purpose of insuring that the generators connected with the lines L' L² and L³ L⁴ are in synchronism or unison with each other when they are to be connected in parallel a synchronizing device, P, is employed. This device consists of an electric converter, $p$, the secondary coil of which is connected with an incandescent lamp, $h$, while its primary coil is connected between the binding-plates $r^4$ and $r^2$ through the switch-points $p^2 p^4$. The binding-plates $r' r^3$ are connected directly to the switch-points $p'$ and $p^3$. When the switch H is closed, the conductors L' and L³ are connected together. Therefore, if either switch H² or H⁴ is open, the difference of potential between its contact-plates is shown on the lamp by reason of connections to $r^2$ and $r^4$.

We claim as our invention—

1. The combination of two driving-engines, two electric generators respectively driven thereby, two alternate-current generators having their respective field-magnet coils normally supplied with currents from the respective generators, and switches for placing field-magnet coils of either alternate-current machine in connection with the first-named generators either singly or in multiple arc, substantially as described.

2. The combination, with two independently-driven electric generators, of two or more alternate-current generators having their field-magnet coils normally supplied from said generators, respectively, switches for placing the field-magnet coils of the alternate current generators either independently or jointly in connection with either or both of the first-named generators, and means for regulating the strength of the current from the latter generators, substantially as described.

3. In an alternate-current system of distribution, the combination of four or more alternate-current generators, two independent sources of current supplying the field-magnet coils of the said generators interchangeably, switches for connecting said generators with said sources independently or in parallel at will, systems of translating devices, and switches for placing said systems of devices in circuit with said generators independently of each other, substantially as described.

4. The combination of the sources of electricity A' and A², the conductors 3 4 and 7 8, and the switch S, for uniting the same, respectively, the switches S' and S², for connecting the last-named conductors with the respective poles of the respective sources of electricity, the alternate-current machines C' C² C³ C⁴, and the switches T' T² T³ T⁴, for placing the field-magnet coils of the respective machines in circuit with said conductors 3 4 and 7 8, substantially as described.

5. The combination of two alternate-current electric generators, independent exciters for the same having their circuit-connections normally through the field-magnet coils of the same, each exciter having a generating capacity sufficient to supply the field-magnets of both alternate-current generators, and switches for connecting the circuit of either exciter through the field-magnet coils of both alternate-current generators.

In testimony whereof we have hereunto subscribed our names this 15th day of October, A. D. 1887.

HENRY M. BYLLESBY.
OLIVER B. SHALLENBERGER.

Witnesses:
W. D. UPTEGRAFF,
DANL. W. EDGECOMB.